United States Patent [19]

Mahapatra et al.

[11] Patent Number: 4,897,671

[45] Date of Patent: Jan. 30, 1990

[54] INTEGRATED OPTIC PRINT HEAD

[75] Inventors: Amaresh Mahapatra, Acton; Roy W. Miller, Stow; Elias Snitzer, Wellesley, all of Mass.

[73] Assignee: Polaroid Corporation, Cambridge, Mass.

[21] Appl. No.: 300,570

[22] Filed: Jan. 23, 1989

[51] Int. Cl.[4] .......................... G01D 9/42; H01S 3/18; G02B 6/12

[52] U.S. Cl. .................................. 346/107 R; 372/43; 350/96.11; 350/96.12; 350/96.15

[58] Field of Search ................... 346/108, 107 R, 160, 346/76 L; 350/96.11, 96.12, 96.15, 96.17; 372/43, 45

[56] References Cited

U.S. PATENT DOCUMENTS 3,621,138 11/1971 McNaney ........................... 346/108
3,841,733 10/1974 Ebersole ............................. 346/108
4,461,007 7/1984 Burnham .............................. 372/45

OTHER PUBLICATIONS

IBM Technical Disclosure Bulletin vol. 20, No. 6, Nov. 1977, pp. 2443-2444, "Laser Print Head Employing a Plurality of Lasers Per Channel" by Crow and Lean.

*Primary Examiner*—Bruce A. Reynolds
*Assistant Examiner*—Scott A. Rogers
*Attorney, Agent, or Firm*—Francis J. Caufield

[57] ABSTRACT

An integrated optics print head includes an array of indepenedently driven semiconductor lasers disposed on a common substrate with their outputs coupled to an integrated waveguide structure. The integrated waveguide structure includes a multiplicity of "S" shaped, low-loss waveguides which have substantially the same length. Further, in order to reduce crosstalk, the region of the waveguide structure at the output where all the waveguides are in close proximity is made as short as possible while maintaining a parallel relation between the waveguide outputs.

10 Claims, 1 Drawing Sheet

INTEGRATED OPTIC PRINT HEAD

TECHNICAL FIELD OF THE INVENTION

The present invention in general relates to laser print head structures and, in particular, to an integrated optics laser print head which utilizes integrated waveguides.

BACKGROUND OF THE INVENTION

There are a number of problems in manufacturing laser print heads which are fabricated from semiconductor lasers. One problem occurs because there is a limit on how close semiconductor lasers may be to each other on a substrate while still being independently addressable. Specifically, the distance between semiconductor lasers fabricated on the same substrate should be greater than approximately 100 microns for them to be independently addressable. If the semiconductor lasers are disposed any closer to each other than that, interference between adjacent lasers occurs when one of them is excited. For that reason, most attempts in the art at fabricating laser print heads have used isolated semiconductor lasers.

Another problem occurs when attempting to couple light from semiconductor lasers to small closely spaced pixel areas. Specifically, optical fiber elements which have previously been used in the art are incapable of achieving the close proximity of the independent output pixels required for a laser print head.

As a result, there is a need in the art for a laser print head structure which: (1) has semiconductor lasers disposed in close proximity to one another while still being individually addressable; (2) has light transmission means which transmits light from the individual, isolated semiconductor lasers to provide output pixels having spacings between adjacent pixels which are substantially smaller than the spacings between adjacent semiconductor lasers; and (3) has light transmission means with low loss due to absorption or scattering and low crosstalk among its several channels.

SUMMARY OF THE INVENTION

Embodiments of the present invention advantageously provide integrated optics laser print heads which comprises an array of independently driven semiconductor lasers disposed on a common substrate with their outputs coupled to an integrated waveguide structure. The integrated waveguide structure comprises a multiplicity of low-loss waveguides, each one of which is coupled to a laser at its input end and outputs a substantial portion of the coupled radiation at its output end. The input ends of the waveguides are spaced far apart in accordance with the spacing of the lasers while their output ends are spaced close together in accordance with the pixel requirements of the laser printer. In addition there is low crosstalk among the waveguides.

As noted above, the inventive integrated optics laser print head comprises an array of independently driven semiconductor lasers disposed on a common substrate. Because of this, the problem of aligning individual lasers and individual waveguides in the integrated waveguide structure is reduced substantially when compared to the problem that would exist if the lasers were disposed on a multiplicity of substrates.

Further, the inventive integrated optics laser print head comprises an integrated waveguide structure comprised of a multiplicity of waveguides, each one of which is coupled to a laser at its input end and outputs a substantial portion of the coupled radiation at its output end. Embodiments of the integrated waveguide structure come in two categories. One category is useful in applications where the optical density change of a photosensitive medium depends on the amount of light to which it is exposed. Thus, in order to maintain a uniform exposure in such applications, the amount of light output from each waveguide of the integrated waveguide structure is required to be substantially equal. Another category finds utility in applications where the exposure of the photosensitive medium operates according to a threshold phenomenon. Thus, in order to maintain a uniform exposure in such applications, the amount of light output from each waveguide of the integrated waveguide structure is required merely to be greater than a predetermined threshold amount.

In one embodiment of the present invention directed to producing a substantially equal amount of output light from the various waveguides, the waveguides have different losses and the amount of bias applied to the lasers is varied in order to compensate for the different losses among the various waveguides. In another embodiment of the present invention directed to producing a substantially equal amount of output light from the various waveguides, lasers are biased at substantially the same level and the waveguides have substantially equal loss in order to obtain substantially the same light output from each. Here, the term substantially equal loss means that the losses among the various waveguides is equal within the sensitivity tolerance limits of the photosensitive medium which is exposed to the outputs from the waveguides, i.e., if the photosensitive medium cannot detect differences of less than, for example, 0.3 dB, then the losses of the waveguides need only be within 0.3 dB of each other to be substantially equal. Nevertheless, in order to have substantially equal loss for each waveguide, the waveguides preferably have substantially equal lengths.

In an embodiment of the present invention directed to producing an amount of output light which is above a predetermined threshold, the waveguides may have an arbitrary loss as long the light output from each is above the predetermined threshold.

In addition to the above-described considerations, there are other requirements which must be considered in designing the integrated waveguide structure of the inventive integrated optics laser print head. A first requirement is to maintain crosstalk among the waveguides at a low level; a second requirement is to reduce the loss in the waveguides to small values; and a third requirement is to fabricate the input regions of the waveguides so they are substantially parallel to each other and to fabricate the output regions of the waveguides so they are substantially parallel to each other to provide that coupling light into and out of the waveguides is easier and more efficient.

The first, second and third requirements are satisfied in a preferred embodiment of the present invention by forming them in the shape of an "S." In such an "S" shaped integrated waveguide structure crosstalk is a concern in the neighborhood of the output regions of the waveguides because there the waveguides are sufficiently close enough so that light radiated from one waveguide may be captured by adjacent waveguides. This occurs because it is only at the output region of the waveguides that the waveguides need be close enough to each other to provide the output pixel spacing required for the laser printer. Thus, because crosstalk between two waveguides is proportional to the length over which the two waveguides are in close proximity, the "S" shaped embodiment is designed so that the neighborhood where the output regions of the waveguides are close to each other is short enough to limit crosstalk to be at a low level. Further, in the preferred "S" shaped embodiment, the input regions of the waveguides are all parallel and the output regions are also all parallel. Still further, the "S" shaped waveguides have only two bends, each of which is designed to limit the amount of loss due to radiation. Yet still further, the "S" shaped waveguides are designed to have substantially the same length.

Integrated waveguide structures have been fabricated, for example, thermally-assisted, Ag-Na exchanged, waveguide structures in soda-lime-silicate glass with propagation losses of approximately 0.7 dB/cm. This propagation loss is used to determine a design limit on the length differential among the individual waveguides of the integrated structure. For example, if the output medium upon which the output light from such a waveguide structure is focused can tolerate a loss differential as large as, 0.25 dB, then the length differential for the waveguides can be as great as 0.3 cm.

Notwithstanding the above, one further consideration pertaining to the inventive laser print head is related to the method of fabrication of the waveguides. This further consideration arises because of the need to fabricate groups of waveguides having small separations between neighboring waveguides, especially in the neighborhood of the output ends thereof. As a result, a preferred embodiment of the present invention is fabricated using "field-assisted ion-exchange" to form the waveguides because this method has an inherent aversion towards diffusion into the low index optical separation region between the waveguides. As a result, loss and crosstalk will be minimized. In addition, in a preferred embodiment, the waveguides are buried in order to reduce light loss due to scattering from surface imperfections on the surface of the integrated waveguide structure.

Thus, preferred embodiments of the inventive integrated print head comprise "S" shaped integrated waveguide structures where: (1) individual waveguides have substantially the length and, thereby, substantially the same loss; (2) the portion of the waveguide structure where the individual waveguides are disposed close to each other in the neighborhood of the output regions thereof is as short as possible in order to minimize crosstalk; (3) the other regions of the integrated waveguide structure have the individual waveguides disposed far enough away from each other so that crosstalk is virtually eliminated; (4) the individual waveguides are fabricated using "field-assisted ion-exchange"; and (5) the waveguides are buried.

BRIEF DESCRIPTION OF THE DRAWING

The present invention may be understood by considering the following detailed description together with accompanying FIG. 1 which shows, in pictorial form, an embodiment of the inventive integrated optics laser print head.

DETAILED DESCRIPTION

Figure 1:
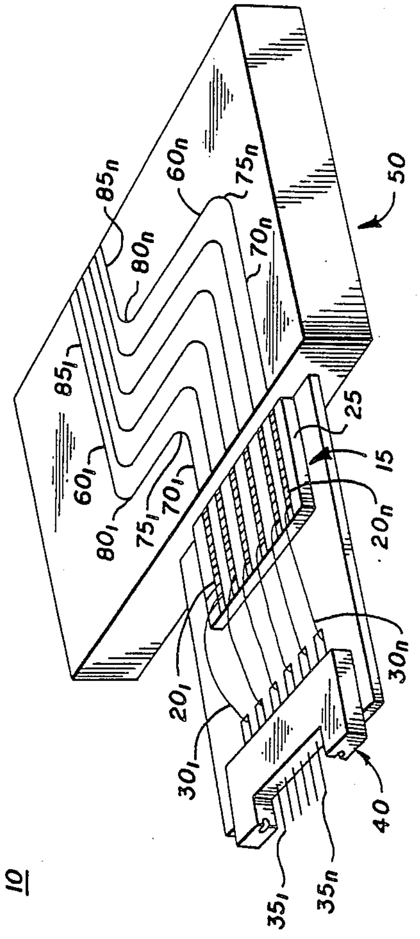

FIG. 1 shows a preferred embodiment of inventive integrated optics laser print head designated at 10. An array 15 of semiconductor lasers $\mathbf{20}_l$ to $\mathbf{20}_n$ fabricated on a substrate 25. The center-to-center spacing between adjacent ones of lasers $\mathbf{20}_l$ to $\mathbf{20}_n$ is defined lithographically and is sufficiently large that the lasers are individually addressable. For example, it was determined that GaAs/AlGaAs lasers emitting radiation at a wavelength of approximately 0.8 microns can be placed at a minimum center-to-center spacing of approximately 100 microns and still be independently addressable. Thus, a typical embodiment of array 15 comprises photolithographically defined stripes having center-to-center spacings between adjacent stripes in the range between 100 to 500 microns and a stripe width of approximately 5–15 microns. Substrate 25, for example, GaAs, has a thickness in the range between 75 to 150 microns. A thickness at the low end of the range, for example, 75 microns, is preferred because this facilitates the ability to independently drive individual lasers $\mathbf{20}_l$ to $\mathbf{20}_n$. Substrate 25 is then bonded by, for example, indium solder for good thermal conduction, to a cleaved diamond substrate, not shown, having a minimum thickness of approximately 250 microns. The cleaved diamond substrate should achieve a substantially perpendicular edge with substrate 25 and substrate 25 should not protrude over the edge of the diamond substrate nor be back from the edge by more than approximately 5 microns. In addition, the diamond substrate is bonded by methods well known to those of ordinary skill in the art to a thermoelectric cooler, not shown. Although laser array 15 is shown to be a GaAs/AlGaAs heterostructure laser, other materials and constructions known in the art may also be used. Shown in FIG. 1 is the embodiment with the epitaxial layers of the laser diodes on the upper surface of the GaAs substrate. The laser diode array can be inverted to have the epitaxial layer nearer the heat sink thereby more readily conducting the heat away to allow higher output values from the diodes.

Lasers $\mathbf{20}_l$ to $\mathbf{20}_n$ are addressed by means of electric signals applied to pins $\mathbf{35}_l$ to $\mathbf{35}_n$ of array 40. Pins $\mathbf{35}_l$ to $\mathbf{35}_n$ are then connected to lasers $\mathbf{20}_l$ to $\mathbf{20}_n$ by leads $\mathbf{30}_l$ to $\mathbf{30}_n$, which are bonded to lasers $\mathbf{20}_l$ to $\mathbf{20}_n$, respectively. The electric signals for exciting the individual lasers are generated by means (not shown) which are well known in the art.

Array 15 is affixed to integrated waveguide structure 50 so that radiation output from lasers $\mathbf{20}_l$ to $\mathbf{20}_n$ is coupled into waveguides $\mathbf{60}_l$ to $\mathbf{60}_n$, respectively. A typical output cross-sectional area for lasers $\mathbf{20}_l$ to $\mathbf{20}_n$ is 5 by 2 micrometers. Array 15 is aligned in x, y, z positions to within 0.1 micron and is also aligned angularly and affixed in place by, for example, temperature stable indium solder or epoxy. As one can readily appreciate from FIG. 1, the ability to align lasers $\mathbf{20}_l$ to $\mathbf{20}_n$ with waveguides $\mathbf{60}_l$ to $\mathbf{60}_n$, respectively, is substantially enhanced because lasers $\mathbf{20}_l$ to $\mathbf{20}_n$ are fabricated on common substrate 25 and have lithographically defined center to center spacing equal to that of the guides.

In a preferred embodiment, waveguides $\mathbf{60}_l$ to $\mathbf{60}_n$ have shapes which meet the following constraints: (1) input regions $\mathbf{70}_l$ to $\mathbf{70}_n$ are substantially parallel to each other and to the orientation of the stripes of lasers $\mathbf{20}_l$ to $\mathbf{20}_n$, respectively, to promote efficient coupling thereinto of light output by lasers $\mathbf{20}_l$ to $\mathbf{20}_n$; (2) output regions $\mathbf{85}_l$ to $\mathbf{85}_n$ are substantially parallel to each other to promote efficient coupling of emerging light for transmittance to the media to be illuminated; (3) waveguides 60$_1$ to 60$_n$ have substantially the same loss and, therefore, substantially the same length; and (4) the portions of waveguide structure 50 where individual waveguides 60$_1$ to 60$_n$ are disposed close to each other is short to minimize crosstalk.

The amount by which the loss in waveguides 60$_1$ to 60$_n$ can differ from one another is determined by the type of photosensitive medium which is exposed to the outputs from the waveguides. For example, if the medium is a threshold medium, i.e., one requiring a certain level of light to cause an effect, the waveguide loss is constrained to be small enough so that the output light is above the predetermined threshold. In such a case, any length differential among the waveguides can be tolerated as long as the light output does not fall below the threshold. On the other hand, if the medium sensitivity to light depends on the intensity in, for example, a linear fashion instead of in a threshold fashion, then the particular design of the embodiment must provide substantially equal loss for the waveguides if the laser outputs are substantially equal. However, in the design sense, the term substantially equal loss means that the loss differential among the various waveguides be equal within the sensitivity tolerance limits of the photosensitive medium which is exposed to the outputs from the waveguides. Thus, if the photosensitive medium cannot detect loss differences of less than, for example, 0.3 dB, then the losses of the waveguides need only be within 0.3 dB of each other to be substantially equal. For this case then with a waveguide material having a propagation loss of approximately 1.0 dB/cm, the requirement of substantially equal loss will be satisfied if the length differential among the waveguides is less than 0.3 cm. Further, this defines the requirement that the individual waveguides have substantially the same length. Furthermore, laser diode bias can be adjusted to compensate for differences in propagation losses.

Waveguides 60$_1$ to 60$_n$ of integrated waveguide structure 50 are "S" shaped waveguides and have input regions 70$_1$ to 70$_n$, respectively, first bends 75$_1$ to 75$_n$, respectively, second bends 80$_1$ to 80$_n$, respectively, and output regions 85$_1$ to 85$_n$, respectively. A typical cross-sectional area of input regions 70$_1$ to 70$_n$ is 10 by 5 micrometers to ensure substantial coupling between lasers 20$_1$ to 20$_n$ and waveguides 60$_1$ to 60$_n$, respectively. Further, input regions 70$_1$ to 70$_n$ are also preferably parallel to each other and to the orientation of the stripes of lasers 20$_1$ to 20$_n$, respectively, to enhance coupling therebetween. Because waveguides 60$_1$ to 60$_n$ are "S" shaped, they may be designed so that: (1) each waveguide has substantially the same length from input end to output end; (2) the neighborhood where the waveguides are close to each other near the output end is as short as possible in order to eliminate cross-talk; and (3) input regions 70$_1$ to 70$_n$ are substantially parallel to each other and output regions 85$_1$ to 85$_n$ are substantially parallel to each other.

In a typical print head application for the inventive integrated optics laser print head the output beams should be approximately 14 microns apart. As a result, the center-to-center spacing of waveguide output regions 85$_1$ to 85$_n$ should also be approximately 14 microns. Because of the resulting close proximity of waveguides 60$_1$ to 60$_n$ in output regions 85$_1$ to 85$_n$, it is necessary to make the neighborhood of these output regions where the waveguides are closely adjacent to each other as small as possible in order to minimize crosstalk, i.e., the phenomenon where light radiated from one waveguide is absorbed by another. Further, the waveguides should be spaced far enough apart from each other in the other regions of waveguide structure 50 that crosstalk is no problem at all.

In FIG. 1, waveguides 60$_1$ to 60$_n$ all have substantially the same length and have an approximate 10 micrometer width and an approximate 5 micrometer depth in soda-lime-silicate glass. The waveguides can be formed by any one of a number of methods known in the art such as, as will be explained in detail below by an Ag-Na or a K-Na ion-exchange process. Waveguide output regions 85$_1$ to 85$_n$ have a center-to-center spacing of approximately 14 microns. The length of output region 85$_n$ is approximately 100–200 micrometers in order for the length of the neighborhood where the waveguides are closely adjacent to each other to be small. The lengths and disposition of the other regions of waveguides 60$_1$ to 60$_n$ are determined by the requirement that the lengths of waveguides 60$_1$ to 60$_n$ be substantially the same. In the normal case this requires the distance between the adjacent other regions to be greater than, for example, 50–100 micrometers, so that there is virtually no crosstalk between these other portions.

The center-to-center spacing between waveguides 60$_1$ to 60$_n$ in input regions 70$_1$ to 70$_n$ is approximately 100 to 500 microns to match the center-to-center spacing of lasers 20$_1$ to 20$_n$. Lastly, the radii of first bends 75$_1$ to 75$_n$ and second bends 80$_1$ to 80$_n$ are chosen with the following two considerations in mind: (1) radiation losses in the bends should be small and (2) the length of the bends should be small so that absorption losses are minimized.

The radii of the bends may be determined in accordance with an article entitled "High Finesse Ring Resonators Made By Silver Ion Exchange In Glass," by J. M. Connors and A. Mahapatra, *J. Lightwave Tech.* Vol. LT-5, No. 12, December, 1987, pp. 1686–1689. This article points out that the smallest bend radius r with a radiation loss of less than 0.1 dB/cm is given by $r=2an_{sub}/(\text{diff}n_{eff})$, where a is the guide width, $n_{sub}$ is the substrate index, and diff$n_{eff}$ is the difference in the effective index of the guided mode and substrate index. If use is made of a guide width of approximately 10 micrometers, a substrate with an index equal to 1.5, and diff$n_{eff}$ approximately equal to 0.05, r can be approximately 500 micrometers and still be well above the radius at which radiation loss becomes significant.

Integrated waveguide 50 can be formed by an ion-exchange process which is well known to those of ordinary skill in the art and can produce losses of the order of 1 dB/cm. For example, a waveguide pattern is photolithographically placed on a soda-lime- silicate glass substrate, for example, Microsheet® glass obtained from Corning Glass, with an appropriate masking material, for example, anodized Al. To do this, a substrate is first coated with a 500 angstrom layer of aluminum which may be anodized in oxalic acid at room temperature. The waveguide pattern is then etched into the anodized aluminum using conventional lithographic techniques. The masked glass substrate is then immersed in molten $AgNO_3$ at, for example, 270° C., to induce an Ag-Na exchange. After the exchange, the substrates are cleaned and the edges suitably polished for endfire coupling.

As can be readily appreciated from the above-described method of making integrated waveguide structure 50, to minimize crosstalk, output regions $\mathbf{85}_l$ to $\mathbf{85}_n$ can be polished back to just after the end of bend $\mathbf{80}_n$. This will minimize the length of the region where outputs regions $\mathbf{85}_l$ to $\mathbf{85}_n$ are in close proximity to one another and will still provide for substantially parallel light output from waveguides $\mathbf{60}_l$ to $\mathbf{60}_n$ of integrated waveguide structure 50.

The above-described method of fabrication by thermal-assisted ion-exchange, has a drawback in that some of the Ag precipitates as a metal over time, which results in increased losses. An alternative, a thermally-assisted ion-exchange process involving K-Na provides a more stable waveguide because the K does not reduce to the metal state as the Ag does. However, even in this case, an improvement occurs if the waveguide is buried because this reduces the loss of radiation due to surface imperfections.

In a preferred embodiment, a buried waveguide may be fabricated by an Na/Ag/K field-assisted ion-exchange process such as that disclosed in a patent application entitled "Method For Fabricating Buried Waveguides", Ser. No. 300,571 filed on common date herewith in the name of Alfred E. Corrigan, and assigned to the assignee of the present invention, which patent application is incorporated by reference herein.

Clearly, those skilled in the art recognize that further embodiments of the present invention may be made without departing from its teachings. As an example, waveguides for radiation may be fabricated from a whole variety of materials well known to those of ordinary skill in the art as, for example, lithium niobate or lithium tantalate. Therefore, it is intended that all matter contained in the above description or shown in the accompanying drawings be interpreted as illustrative and not limiting.

What is claimed is:

1. A print head having a predetermined spacing between outputs, which print head comprises:

a multiplicity of independently excitable light sources fabricated on a first substrate; and an integrated waveguide structure comprising a multiplicity of waveguides having an input end and an output end fabricated on a second substrate, said first and second substrates being aligned so that light from said light sources is coupled into the input end of said waveguides, said waveguides having a shape which comprises a first bend disposed after said input end and a second bend disposed after said first bend and before said output end to form a substantially "S" shape, said waveguides being disposed so that the distance between adjacent waveguides is substantially equal to a predetermined spacing after said second bend and the distance between adjacent waveguides is substantially greater than another predetermined spacing at all other portions.

2. The print head of claim 1 wherein said input ends of said waveguides are substantially parallel to each other and said output ends of said waveguides are substantially parallel to each other.

3. The print head of claim 2 wherein the radii of said first and second bends are substantially the same.

4. The print head of claim 3 wherein the lengths of said waveguides are substantially the same.

5. The print head of claim 3 wherein said light sources are semiconductor lasers.

6. The print head of claim 5 wherein said waveguides are formed by an ion exchange process.

7. The print head of claim 6 wherein said second substrate comprises a glass containing Na and said ion-exchange process comprises an Ag-Na ion exchange process.

8. The print head of claim 6 wherein said second substrate comprises a glass containing Na and said ion-exchange process comprises a K-Na ion exchange process.

9. The print head of claim 5 wherein said waveguides are buried waveguides.

10. The print head of claim 9 wherein said second substrate comprises a glass containing Na and said buried waveguides are formed by an Na/Ag/K field-assisted ion exchange process.

* * * * *